United States Patent [19]

Poe

[11] Patent Number: 4,991,885
[45] Date of Patent: Feb. 12, 1991

[54] TRIGGER LOCK CAM

[75] Inventor: L. Richard Poe, Long Beach, Calif.

[73] Assignee: The Hartwell Corporation, Placentia, Calif.

[21] Appl. No.: 394,634

[22] Filed: Aug. 16, 1989

Related U.S. Application Data

[63] Continuation of Ser. No. 92,001, Sep. 2, 1987, Pat. No. 4,877,274.

[51] Int. Cl.⁵ .................................................. E05C 5/00
[52] U.S. Cl. .................................... 292/113; 292/108; 292/DIG. 31
[58] Field of Search ............ 292/66, 100, 113, 341.12, 292/341.13, DIG. 31, DIG. 56, DIG. 73, 107, 108

[56] References Cited

U.S. PATENT DOCUMENTS

| | | |
|---|---|---|
| 2,348,065 | 2/1943 | George . |
| 2,559,736 | 11/1945 | Scarborough . |
| 2,712,955 | 9/1952 | Andrews . |
| 3,194,595 | 8/1962 | Wheeler . |
| 3,259,411 | 12/1963 | Griffiths . |
| 4,116,479 | 1/1977 | Poe . |
| 4,220,364 | 8/1978 | Poe . |
| 4,318,557 | 3/1982 | Bourne . |
| 4,531,769 | 7/1985 | Glancy ............................. 292/113 |
| 4,538,843 | 9/1985 | Harris . |
| 4,643,470 | 2/1987 | Kazuyuki . |

FOREIGN PATENT DOCUMENTS 1560701 7/1976 United Kingdom .

Primary Examiner—Gary L. Smith
Assistant Examiner—Michael J. Milano
Attorney, Agent, or Firm—Lyon & Lyon

[57] ABSTRACT

A latch handle assembly for securing a latch having a trigger pin includes a handle pivotally joined to the latch. A trigger latch is pivotally joined to the handle and includes an opening engageable onto the trigger pin. A cam is pivotally joined to the handle and is engageable onto the trigger pin to compensate for any clearances between the parts, and thereby prevent chattering and excessive wear within the handle assembly due to vibration.

3 Claims, 4 Drawing Sheets

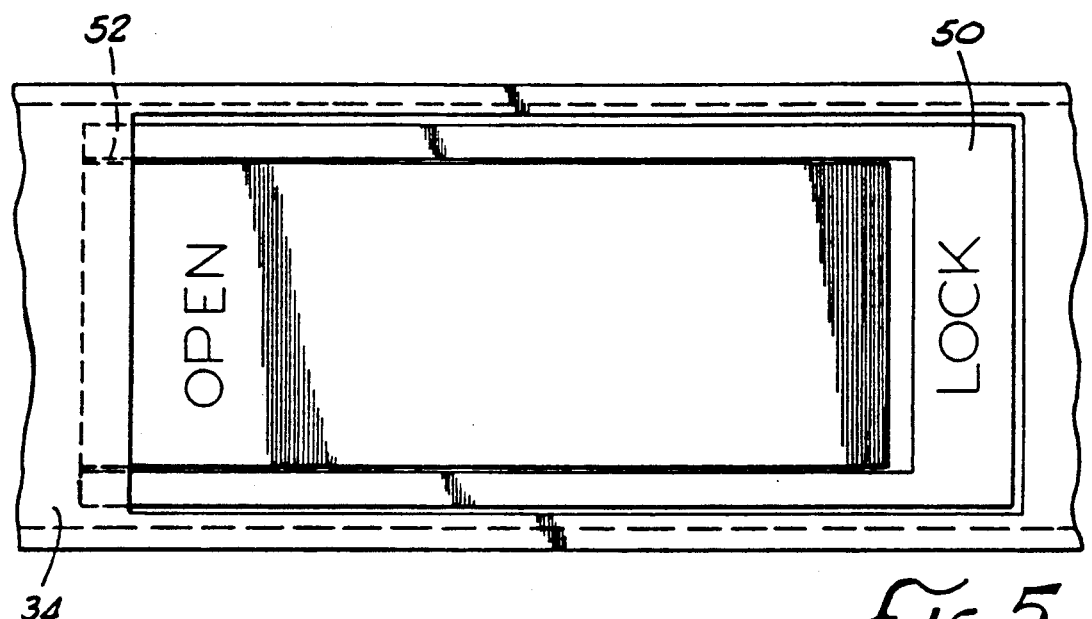
FIG. 5.
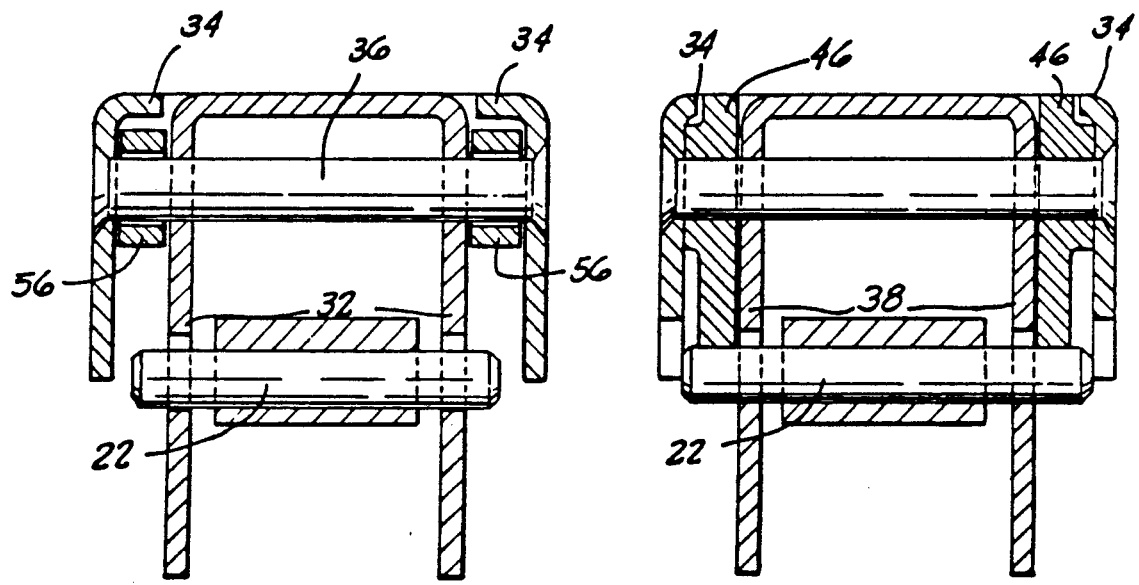
FIG. 6.
PRIOR ART
FIG. 7.

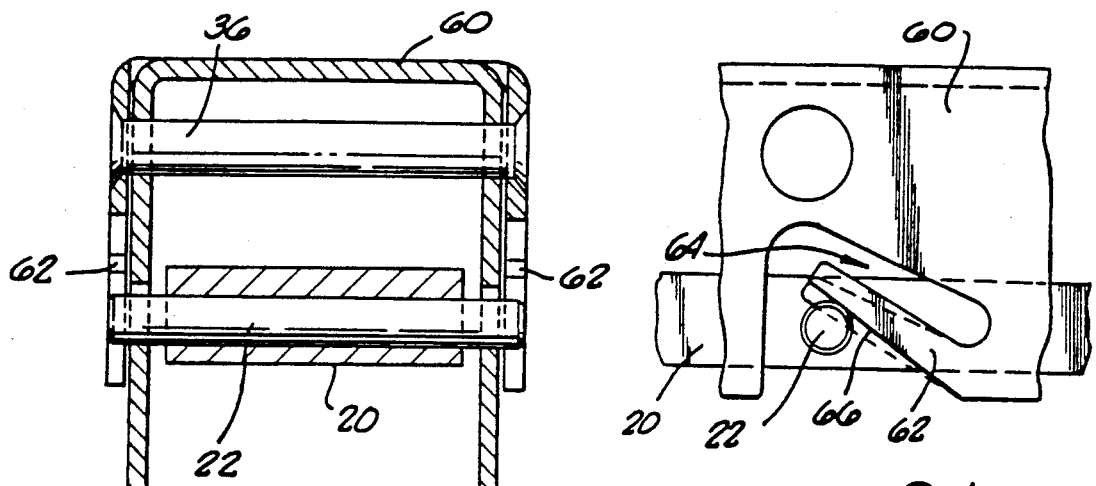
fig. 8.
fig. 9.
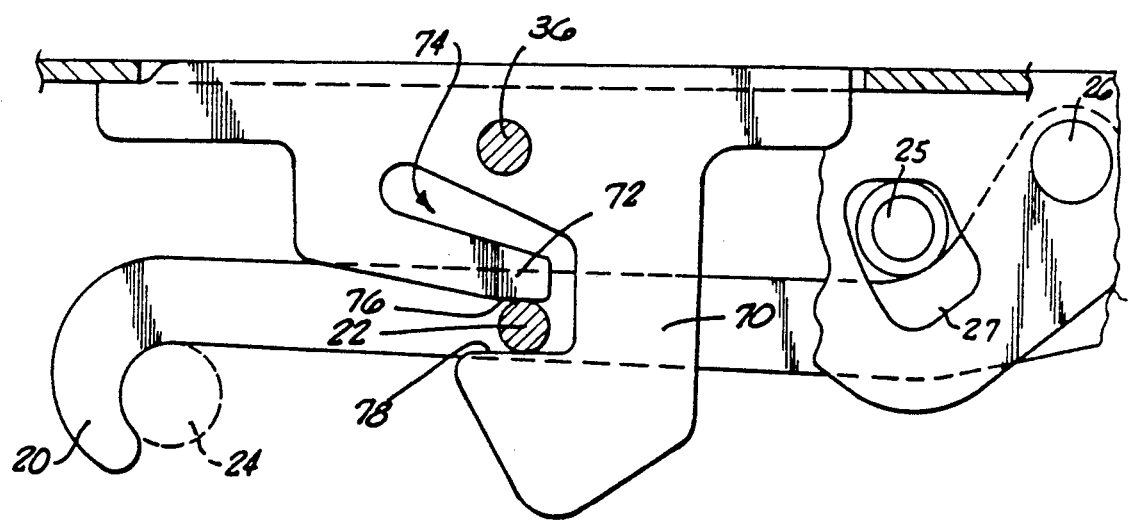
fig. 10.

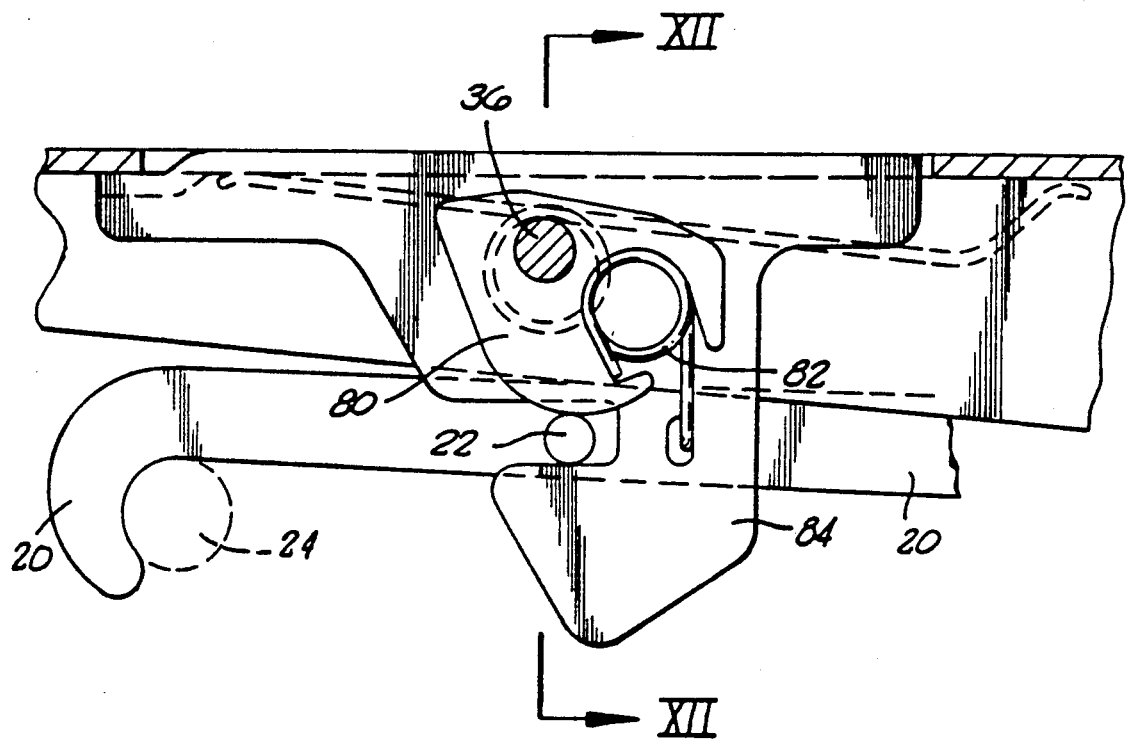
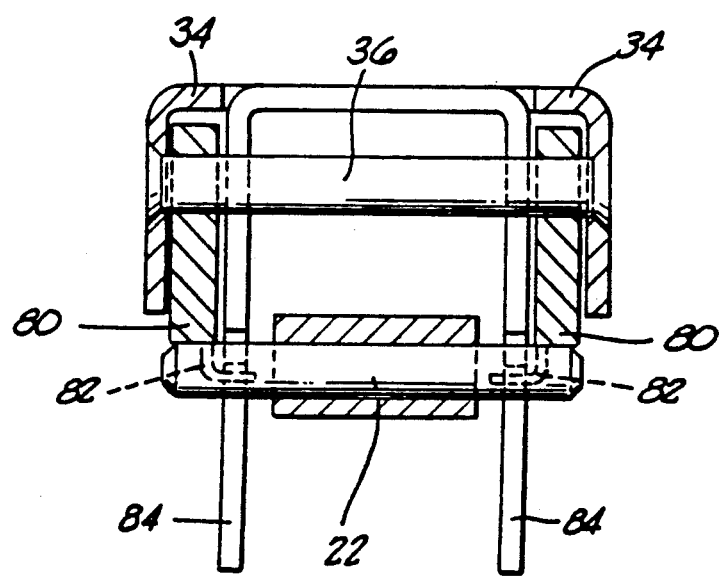
fig.12.

TRIGGER LOCK CAM

This is a continuation of Ser. No. 092,001 filed Sept. 2, 1987 and now U.S. Pat. No. 4,877,274.

BACKGROUND OF THE INVENTION

The field of the present invention is latches.

Hook latches are often used to secure a door or panel, especially in aircraft structures. These hook latches often include a handle and a trigger latch engaged to a trigger pin on the hook latch, for securing the hook latch into its engaged position. However, hook latches with handle and trigger configurations can experience in service wear caused by the loading of the hook latch. In addition, positive and negative air pressures, mechanical air frame forces and vibrations, as well as sonic vibrations can combine to cause further wear on the handle, trigger latch, or trigger pin. This wear can result in the handle and trigger being loose. Although remaining locked, the mechanism might vibrate or not lie entirely flush with the associated panel.

SUMMARY OF THE INVENTION

The present invention is directed to a latch handle assembly for reliably securing a latch having a trigger pin. To this end, a latch handle is pivotally joined to the latch, and a trigger latch is pivotally joined to the handle. The trigger latch includes a trigger slot engageable around a trigger pin protruding from the latch. A cam is operatively joined with the latch handle and is engageable against the trigger pin to prevent chattering in the handle assembly. The latch handle, or the trigger latch, may also include biasing means for preventing relative movement between the trigger latch and pin.

Accordingly, it is an object of the present invention to provide a latch handle assembly which resists the aforementioned wear problems. Other and further objects and advantages will appear hereinafter.

BRIEF DESCRIPTION OF THE DRAWINGS

In the drawings wherein similar reference characters denote similar elements throughout the several views:

FIG. 5 is a top view of the latch handle assembly of FIG. 3;

FIG. 6 is a section view taken along line VI—VI of FIG. 2;

FIG. 7 is a section view taken along line VII—VII of FIG. 3;

FIG. 8 is a side elevational fragmentary view of the handle of a second embodiment of the present latch handle assembly;

FIG. 9 is a side view thereof;

FIG. 10 is a side elevational view of the trigger latch of a third embodiment of the latch handle assembly of the present invention;

FIG. 11 is a side elevational view of a fourth embodiment; and

FIG. 12 is a sectional view taken along line XII—XII thereof.

DETAILED DESCRIPTION OF THE PREFERRED EMBODIMENTS

Figure 1:
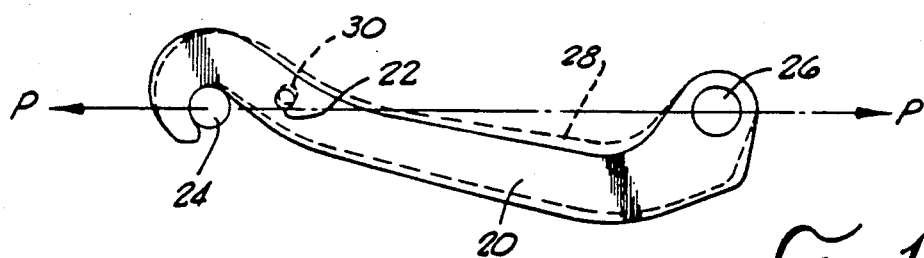
FIG. 1 is a schematic side view illustrating the elastic deformation under loading of a known hook latch.

Turning now in detail to the drawings, FIG. 1 illustrates a known hook member 20 inking a hook pivot pin 26 to a fixed keeper 24. The hook member 20 includes a trigger pin 22 fixed to the hook member 20 generally adjacent to the keeper 24 and extending parallel thereto on either side of the hook latch. Arrows P represent a tensile load applied to the member 20 through the keeper 24 and the hook pivot pin 26. This mechanical load causes the hook member 20 to elastically deform, generally into a shape shown in an exaggerated format by phantom line 28. As a result of this deformation, the position of the trigger pin 22 is similarly shifted to a position indicated by phantom line 30. If the load P is cyclically varying or alternating, e.g. vibration loading and fluctuating air pressure differentials, as is often found in aircraft, the trigger pin 22 can be driven between the solid line 22 and phantom line 30 positions shown in FIG. 1.

Figure 2:
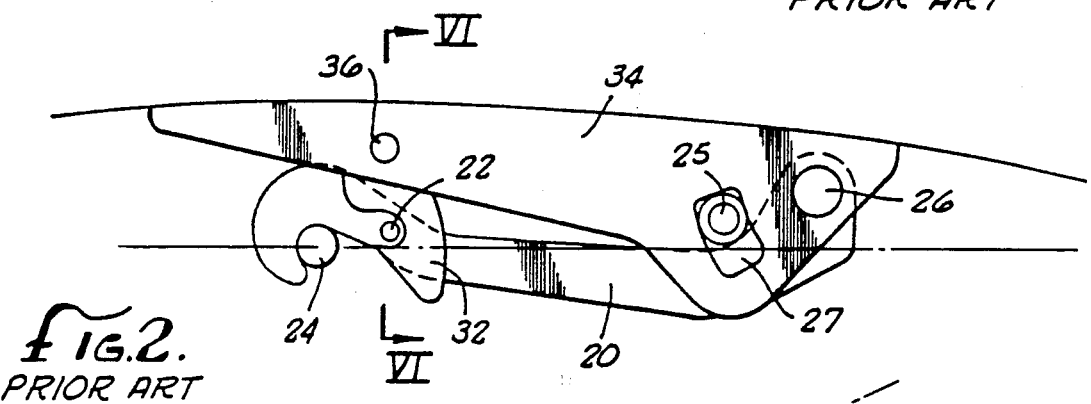
FIG. 2 is a schematic side view of the hook latch of FIG. 1 including a hook latch handle and a trigger latch engaged onto a trigger pin.

FIG. 2 illustrates the hook member 20 held in place onto the keeper 24 by a handle 34 having a restraining pin 25 mounted in a kidney slot 27 located generally adjacent to the hook pivot pin 26. At the other end of the handle 34 adjacent to the trigger pin 22 is a handle pin 36 pivotally mounting a trigger member 32. A slot in the trigger member 32 engages the trigger pin 22 to hold the handle 34 into a closed position as the trigger member 32 is pivoted about the handle pin 36. The handle 34 thereby holds the hook member 20 onto the keeper 24 through the restraining pin 25.

However, if the hook member 20 is subjected to vibration loading, there is a tendency for the trigger pin 22 to vibrate within the slot in the trigger member 32. The relative movement between the trigger pin 22 and the trigger member 32 creates chattering or hammering forces within the slot which can result in the enlargement via wear of the slot in the trigger latch, or the slot in the handle for accommodating the handle pin 36.

Figure 3:
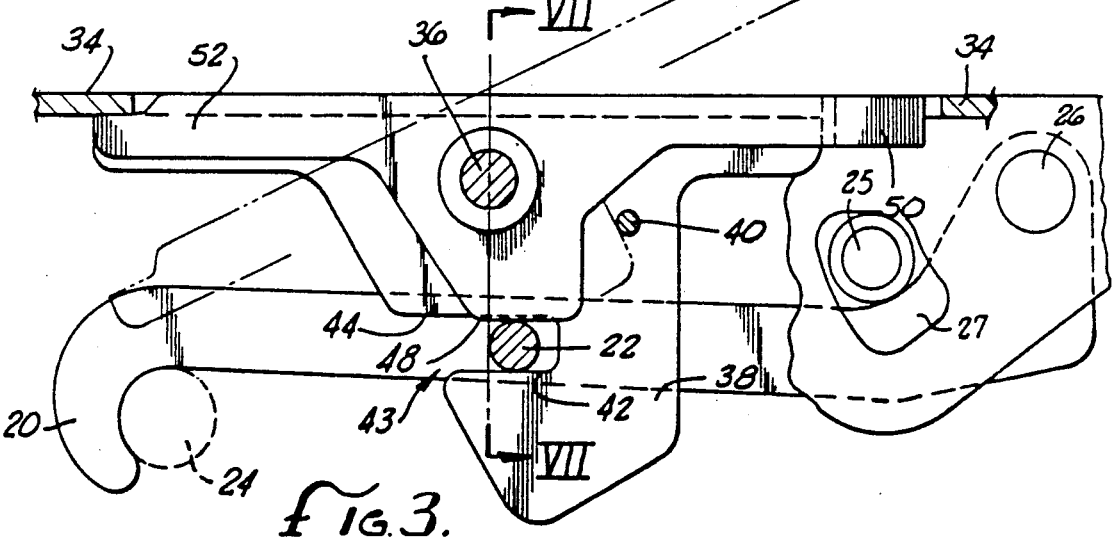
FIG. 3 is a side elevational view of the latch handle assembly of the present invention with a cam engaging the trigger pin.
Figure 4:
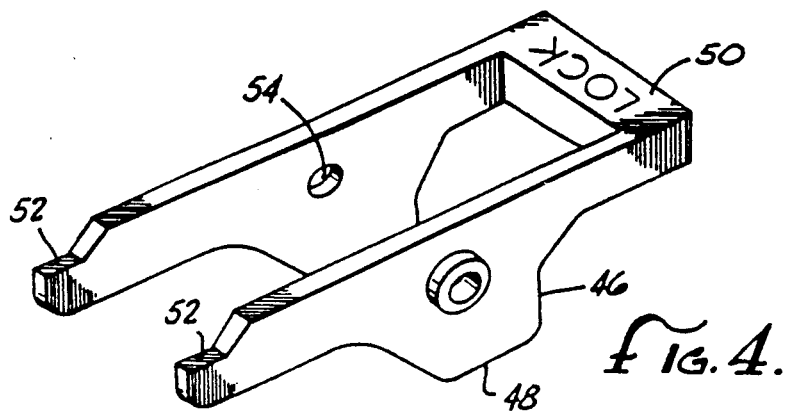
FIG. 4 is a perspective view of the cam element of FIG. 3.

As shown in FIG. 3, a latch handle assembly which overcomes these problems includes a cam 46 pivotally mounted on the handle 34 by the handle pin 36. The cam 46 includes a bridge section 50, and a pair of cam arms 52, each of which has a cam bearing surface 48, as illustrated in FIGS. 4 and 5. A trigger latch 38 includes a trigger latch opening or slot 43 bounded by a first trigger latch surface 42, and or slot a second surface 44. The opening 43 must be marginally larger than the diameter of the trigger pin 22, so that it can be assured that the slot 43 of the trigger latch 38 can be engaged around the trigger pin. A stop pin 40 is also provided on the trigger latch 38.

As best shown in FIG. 7, the cam 46 is disposed in between the trigger latch 38 and the handle 34, so that the handle assembly remains compact. In addition, a comparison of FIG. 7 with FIG. 6 (which is a cross section of the known handle assembly of FIG. 2) demonstrates that the cam 46 may be retrofitted onto existing hook latch handle assemblies by replacing the spacers 56, which center the trigger latch within the handle 34, with the cam 46.

In operation, after the hook member 20 is engaged onto the keeper 24, the handle 34 is pivoted towards the hook member 20, and the trigger latch 38 is pivoted about the handle pin 36 so that the trigger latch slot 43 engages the trigger pin 22. Due to the clearances provided to ensure this engagement, a small clearance space typically remains after the engagement of the trigger pin 22 and the slot. Referring to FIG. 3, the cam 46 is then pivoted about the handle pin 36 so that the cam bearing surface 48 engages the trigger pin 22. This camming engagement takes up any clearance between the trigger pin 22 and the opening 43. As a result, the trigger pin 22 is firmly clamped between the cam bearing surface 48 and the first surface 42 of the trigger latch 38.

The cam bearing surface 48 can be forceably engaged against the trigger pin 22 by exerting force on the cam bridge section 50 joining the cam arms 52 (FIG. 4). As the distance between the handle pin 36 and the bridge 50 is substantially larger than the distance between the handle pin 36 and the cam surface 48, the force exerted on the bridge 50 is multiplied through a leverage effect to ensure a secure engagement of the cam surface 48 against the trigger pin 22. With the cam 46 fully engaged, the clearances within the parts of the hook latch handle assembly are taken up, so that the handle assembly essentially forms a unit of rigidly interconnected parts, thereby precluding the generation of any chattering and the attendant premature wear within the handle assembly.

FIG. 8 illustrates a second embodiment of the invention wherein a handle 60 includes a relieved section 64 forming a biasing element 62 having a bearing surface 66. As the handle 60 is pivoted towards the hook member 20, the bearing surface 66 the biasing element 62 engages the trigger pin 22 in a spring-like manner. The trigger latch 38 may then be engaged onto the trigger pin 22 (not shown) while the handle 60 is depressed against the force of the biasing element 62. When the handle 60 is released, the biasing element 62 urges the handle away from the trigger pin 22, thereby inducing the forceful engagement of the first surface 42 of the trigger latch 38 against the trigger pin 22, so as to take up any clearances and provide a durable vibration resistant handle assembly. The biasing element 62 prevents chattering between the trigger pin 22 and the trigger slot 43 as well as between the handle pin 36, trigger member 32, and handle 34, and it provides a more elastic engagement than the cam 46 in the embodiment of FIG. 3.

A third embodiment is illustrated in FIG. 10 wherein a modified trigger latch 70 has a relieved section 74 and a biasing element 72 having a bearing surface 76 for elastically engaging the trigger pin 22, in a manner similar to the embodiment shown in FIG. 8. However, in the embodiment of FIG. 10, the biasing element is on the trigger latch, rather than on the handle.

A fourth embodiment of the hook latch handle assembly of the present invention is illustrated in FIG. 11 wherein a cam plate 80 is mounted alongside the trigger latch 84 on the handle pin 36. A spring 82 biases the cam plate 80 so that the cam plate is constantly engaged against the trigger pin 22. Preferably, a cam plate and spring is provided on each of the legs 33 and 35 of the trigger latch 84. With the configuration of FIG. 11, the cam plates automatically compensate for any clearances which develop in the hook latch assembly due to wear, temperature, etc.

Thus, a durable latch handle assembly is disclosed which resists failure due to fluctuating loading, and securely maintains the mutual engagement of the latch and keeper. While embodiments and applications of this invention have been shown and described, it will be apparent to those skilled in the art that many more modifications are possible without departing from the inventive concepts herein. The invention, therefore, is not to be restricted except in the spirit of the appended claims.

What is claimed is:

1. A latch handle assembly for securing a latch having a trigger pin comprising:
    a handle pivotally joined to the latch;
    a trigger latch pivotally joined to said handle and including a trigger opening engageable onto the trigger pin;
    at least one cam plate pivotally mounted onto said trigger latch; and
    biasing means for biasing said cam plate against the trigger pin.

2. A trigger lock cam for securing a latch having a trigger pin comprising:
    a trigger latch having a slot rotatably engageable over a first side of the trigger pin;
    a cam pivotally connected to said trigger latch and engageable against a second side of the trigger pin; and
    biasing means for continuously biasing said cam against the trigger pin.

3. The trigger lock cam of claim 2 wherein said biasing means comprises a spring having a first end secured to said trigger latch and a second end secured to said cam.

* * * * *